April 24, 1928. E. R. KNIGHT Re. 16,945

AUTOMOBILE THEFT LOCK

Original Filed Dec. 7, 1925 2 Sheets-Sheet 1

Inventor.
EDWARD R. KNIGHT
By Victor J. Evans
Attorney

April 24, 1928. E. R. KNIGHT Re. 16,945
AUTOMOBILE THEFT LOCK
Original Filed Dec. 7, 1925 2 Sheets-Sheet 2
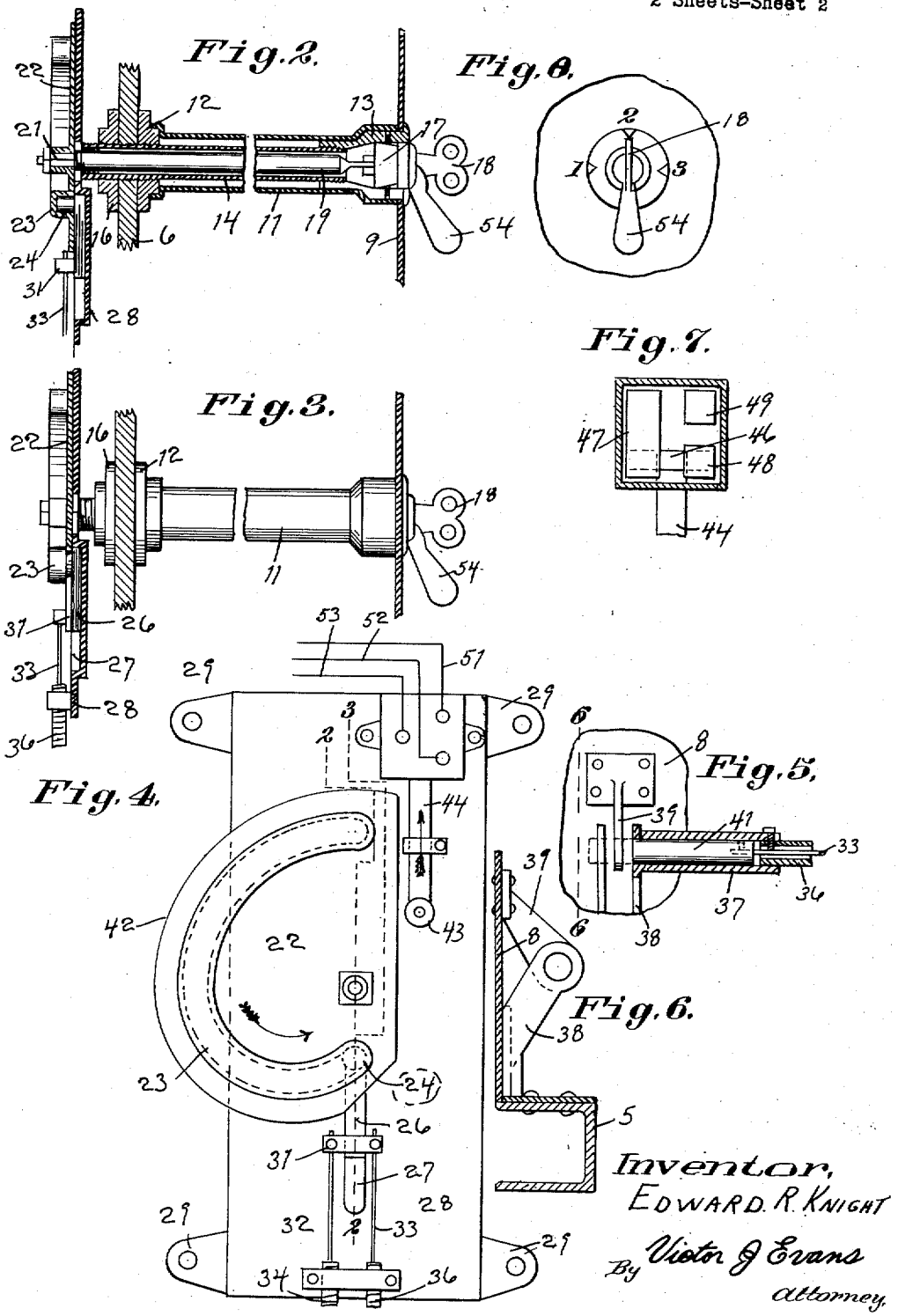
Inventor,
EDWARD R. KNIGHT
By Victor J. Evans
Attorney.

Reissued Apr. 24, 1928. Re. 16,945

UNITED STATES PATENT OFFICE.

EDWARD R. KNIGHT, OF CARSON CITY, NEVADA, ASSIGNOR, BY MESNE ASSIGNMENTS, TO MITCHELL SPECIALTY COMPANY, OF PHILADELPHIA, PENNSYLVANIA.

AUTOMOBILE THEFT LOCK.

Original No. 1,598,529, dated August 31, 1926, Serial No. 73,759, filed December 1, 1925. Application for reissue filed March 10, 1928. Serial No. 260,693.

This invention relates to improvements in automobile theft locks, and has particular reference to means for locking an automobile against theft and to further cause an alarm to be given when an attempt is made to steal the automobile.

Another object is to provide means whereby the locking mechanism is protected against tampering while in a locked position.

Another object is to provide means for locking the ignition system and the hood protecting the engine.

A further object is to provide a device of this character which is simple in construction and therefore cheap to manufacture.

A still further object is to provide means which may be applied to any standard make of automobile without altering the construction of the same.

Other objects and advantages will be apparent during the course of the following description.

In the accompanying drawings forming a part of this specification, and in which like numerals are employed to designate like parts throughout the same, Figure 1 is a fragmentary detail view showing a portion of an automobile in cross-section and having my device applied thereto;

Figure 2 is a vertical cross section taken on the line 2—2 of Figure 4;

Figure 3 is a vertical cross section taken on the line 3—3 of Figure 4;

Figure 4 is a front elevation of my device as the same would appear in looking from the radiator toward the dashboard;

Figure 5 is a fragmentary detail view showing the hood-locking mechanism;

Figure 6 is a cross section taken on the line 6—6 of Figure 5;

Figure 7 is a cross sectional view of the switch mechanism; and

Figure 8 is a front plan view of the switch as shown in Figure 2, looking from the driver's seat.

Figure 1:
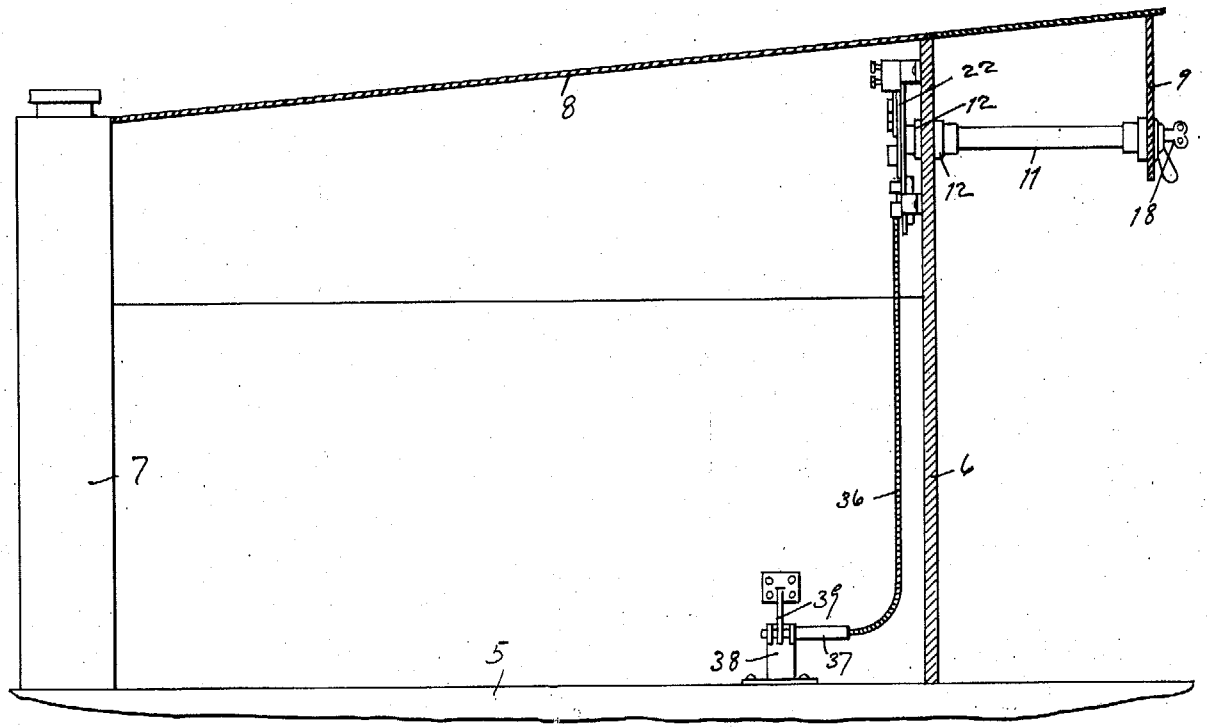

Applicant is aware of the fact that many forms of automobile locks have been placed upon cars, the same locking the ignition and transmission and other parts of the automobile independently. Applicant has devised a lock which automatically breaks the ignition circuit to the distributor, also automatically locks the hood of the automobile against being raised thereby precluding the thief getting to the engine, and also automatically manipulating a switch whereby should a thief attempt to place a wire around the customary lock an alarm would be given.

In the accompanying drawings, wherein for the purpose of illustration is shown a preferred embodiment of my invention, the numeral 5 designates the frame of an automobile, the numeral 6 the dash thereof, 7 the radiator and 8 the hood, while at 9 is shown the customary instrument board.

Between the instrument board 9 and the dash-board 6 is a tubular member 11 which is free to rotate on bearing members 12 and 13. Within this tubular member 11 is a second tubular member 14 which is secured to the bearing members 12 and 13 and also to a nut 16 secured to the upper surface of the dash-board 6. The result of the structure thus far described is that should a thief place a wrench upon the tubular member 11 the same would rotate and therefore he could not in any manner turn the locking mechanism. The locking mechanism proper consists of the ordinary cylinder lock 17 operated by a key 18.

When turned this cylinder lock 17 is adapted to rotate a shaft 19 having a squared end 21 upon which a plate 22 is secured. This plate 22 has raised outwardly therefrom a cam track 23 within which a roller 24 is positioned. This roller 24 is mounted upon a slider 26 slidably positioned in a slot 27 formed in a plate 28 which is secured to the dash-board 6 as by lugs 29.

A cross piece 31 is secured to the slider 26 and has extending therefrom wires 32 and 33. These wires pass through tubular shells 34 and 36 and are commonly known as Bowden wires.

Referring now to Figures 1 and 5, it will be noted that the shell 36 is secured to the tubular portion 37 of a bifurcated bracket 38, which bracket is secured to the frame 5 of the automobile.

Attached to the hood 8 is an arm 39 which is adapted to lie between the bifurcated portions of the bracket 38 when the hood 8 is in a closed position. This arm 39 has an opening therethrough which coincides with openings formed in the bracket 38 which permits a pin 41 secured to the end of the wire 33 to be projected from the tubular member 37, through the arm 39, thereby locking the hood 8 against being raised.

It is of course understood that the structure on both sides of the hood is identical, and that the wires 32 and 33 extend to opposite sides of the hood.

The cam plate 22 is provided with an exterior cam 42, which is adapted to contact a roller 43 mounted upon the end of an arm 44. This arm 44 carries a wiping contact 46 which contacts a block 47 at all times, and when in its lowermost position, as shown in Figure 7, contacts a block 48. A block 49 is positioned in alignment with the block 48, so that when the arm 44 is raised the wiper 46 will move into contact with the block 49. The block 49 is connected by a wire 51 to a suitable alarm, such as the horn of the machine. The block 48 is connected by a wire 52 to the distributor of the car, and the block 47 is connected by a wire 53 to the customary switch of the car.

The result of the structure thus far described is that when the key 18 is placed in the lock 17 and rotated so as to unlock the device, the handle 54 may be moved to one of three positions, designated by the numerals 1, 2 and 3, of Figure 8. When in the position of the numeral 1, the parts are in the position shown in Figure 4, the result being that the hood 8 may be raised if desired, or the car may be driven. When moved to the position of the numeral 2 of Figure 8, the result will be that the cam plate 22 will have been given a partial rotation, as indicated by the arrow of Figure 4, which rotation will push down on the Bowden wides 32 and 33, the cross piece 31, slider 28 and roller 24, with the result that the pins 41 will be moved to their dotted line position of Figure 5, thus locking the hood 8 against being raised. Further manipulation of the handle 54 to the position 3 of Figure 8, will result in the cam 42 contacting the lever 43, thus moving the arm 44 upwardly as indicated by the arrow thereabove in Figure 4, resulting in the wiper 46 moving from the block 48 to the block 49 and thus breaking the circuit to the distributor of the engine, thereby preventing the engine from being started and further completing the circuit to the horn. Accordingly, should an unauthorized person attempt to bridge around the customary switch of the car, he will of necessity complete the circuit to the horn and give an audible signal.

It will thus be seen that a machine equipped with my device is entirely protected against tampering and at the same time protected against operation by an unauthorized person.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:

1. In combination with an automobile, a locking mechanism thereon, said locking mechanism comprising a rotatable member, a cam secured thereto, a roller adapted to be actuated by said cam, a slider secured to said roller, a pair of wires secured to said slider and extending to a remote point for the purpose of locking the hood of said automobile when said rotatable member is moved.

2. In combination with an automobile, a locking mechanism comprising a key-actuated lock, a rod secured thereto and adapted to be rotated thereby, a plate secured to said rod, a cam formed in said plate, a second cam formed on the edge of said plate, said first mentioned cam being adapted to actuate a pair of pins located at a remote point on said automobile.

3. In combination with an automobile having a hood and an ignition system, a locking mechanism therefor comprising a key-actuated lock, a rod secured thereto, a tubular housing surrounding said rod and being free to rotate thereabout, a plate secured to said rod and adapted to be moved thereby, a cam formed on said plate, a second cam formed on the edge of said plate, a roller adapted to be engaged by said first mentioned cam, a slider secured to said roller, a pair of wires secured to said slider, a bolt secured to the opposite end of each of said wires, each of said bolts being positioned in the tubular portion of a bracket positioned adjacent the hood of said automobile, an arm secured to the hood of said automobile and adapted to be engaged by said bolt, a contact mechanism having a plurality of contacts, a wiper adapted to be moved over said contacts, an arm secured to said wiper, a roller secured to said arm, said roller being adapted to be actuated by said second mentioned cam formed on said plate.

4. In combination with an automobile having an ignition system, a locking mechanism therefor, said locking mechanism comprising a key-actuated lock, a cam secured thereto, a wire actuated in opposite directions by said cam, extending to a remote point for the purpose of locking and unlocking an essential part of the automobile when said locking mechanism is selectively rotated.

5. In combination with an automobile, a locking mechanism thereon, said locking mechanism comprising a rotatable member, a cam secured thereto, a wire actuated in opposite directions by said cam extending to a remote point for the purpose of locking and unlocking an essential part of the automobile when said rotatable member is moved, and an ignition system adapted to be locked by the rotation of said rotatable member.

6. The combination, with an automobile, having a locking mechanism therefor, said locking mechanism comprising a rotatable member, a cam secured thereto, a wire actuated in opposite directions by said cam extending to a remote point for the purpose of locking and unlocking an essential part of the automobile, said wire being reciprocated by the rotation of said cam, of an ignition system having a plurality of contacts adapted to be opened and closed as and when said rotatable member is moved.

EDWARD R. KNIGHT.